US012806951B2

(12) United States Patent
Park et al.

(10) Patent No.: US 12,806,951 B2
(45) Date of Patent: Nov. 24, 2026

(54) NOISE REDUCTION SYSTEM AND NOISE REDUCTION METHOD FOR AUTOMOBILE SUSPENSION

(71) Applicant: HL MANDO CORPORATION, Gyeonggi-do (KR)

(72) Inventors: Jaewan Park, Gyeonggi-do (KR); Namhyeon Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 60 days.

(21) Appl. No.: 18/885,653

(22) Filed: Sep. 14, 2024

(65) Prior Publication Data

US 2025/0178394 A1 Jun. 5, 2025

(30) Foreign Application Priority Data

Dec. 4, 2023 (KR) ........................ 10-2023-0173191

(51) Int. Cl.

*G01H 11/08* (2006.01)
*B60G 17/016* (2006.01)
*B60G 17/018* (2006.01)
*B60G 17/019* (2006.01)

(52) U.S. Cl.

CPC ......... *B60G 17/016* (2013.01); *B60G 17/018* (2013.01); *B60G 17/01941* (2013.01); *B60G 2400/206* (2013.01); *B60G 2400/90* (2013.01); *B60G 2401/10* (2013.01); *B60G 2500/10* (2013.01); *B60G 2600/182* (2013.01); *B60G 2600/44* (2013.01); *B60G 2800/91* (2013.01); *G01H 11/08* (2013.01)

(58) Field of Classification Search

CPC ................ B60G 17/016; B60G 17/018; B60G 17/01941; B60G 2400/206; B60G 2400/90; B60G 2401/10; B60G 2500/10; B60G 2600/182; B60G 2600/44; B60G 2800/91; G01H 11/08

USPC ............................................................ 701/37

See application file for complete search history.

(56) References Cited

U.S. PATENT DOCUMENTS 4,907,680 A * 3/1990 Wolfe ........................ F16F 9/46 280/214
5,060,919 A * 10/1991 Takano ................ B60G 99/008 180/312

(Continued)

*Primary Examiner* — Kurt Philip Liethen
*Assistant Examiner* — John D Bailey
(74) *Attorney, Agent, or Firm* — WOMBLE BOND DICKINSON (US) LLP

(57) ABSTRACT

The present disclosure relates to a noise reduction system for an automobile suspension for reducing structurally transmitted noise caused by vibrations generated when a damper of the suspension operates and entering the interior of the automobile. The noise reduction system comprises: a vibration detection unit that is mounted on the suspension damper; an anti-phase vibration generator that is mounted on a top mount portion of a vehicle body on which the suspension damper is mounted and generates vibration in an opposite phase to vibration generated when the damper operates to be applied to the top mount portion; and a control unit that receives a measurement value detected by the vibration detection unit, calculates a target anti-phase vibration, and controls the anti-phase vibration generator.

19 Claims, 4 Drawing Sheets

(56) References Cited

U.S. PATENT DOCUMENTS

| | | | | | |
|---|---|---|---|---|---|
| 5,154,403 | A * | 10/1992 | Sato | F16F 1/3615 | 267/293 |
| 5,226,500 | A * | 7/1993 | Doi | F16F 13/30 | 180/312 |
| 5,236,182 | A * | 8/1993 | Aoki | F16F 13/30 | 267/140.14 |
| 5,386,372 | A * | 1/1995 | Kobayashi | G10K 11/17855 | 700/280 |
| 5,489,115 | A * | 2/1996 | Osaki | B60G 17/018 | 280/5.515 |
| 5,497,324 | A * | 3/1996 | Henry | B60G 17/0157 | 280/5.503 |
| 5,570,289 | A * | 10/1996 | Stacey | B60G 17/018 | 701/37 |
| 5,651,072 | A * | 7/1997 | Nakao | F16F 15/02 | 381/71.2 |
| 6,018,689 | A * | 1/2000 | Kumura | F16F 15/02 | 702/56 |
| 7,747,359 | B2 * | 6/2010 | Katrak | G05D 1/0891 | 280/124.1 |
| 8,265,825 | B2 * | 9/2012 | Kajino | B60G 17/0165 | 280/124.108 |
| 8,285,449 | B2 * | 10/2012 | Lyoda | B60G 17/08 | 303/140 |
| 9,452,657 | B1 * | 9/2016 | Giaier | B60Q 1/08 | |
| 10,065,474 | B2 * | 9/2018 | Trangbaek | B60G 17/0165 | |
| 2010/0094503 | A1 * | 4/2010 | Li | B60G 13/001 | 280/5.514 |
| 2010/0204881 | A1 * | 8/2010 | Muragishi | B60G 17/018 | 267/140.15 |
| 2010/0204885 | A1 * | 8/2010 | Kajino | B60G 17/0165 | 701/37 |
| 2011/0160960 | A1 * | 6/2011 | Kajino | B60G 17/025 | 701/38 |
| 2012/0053791 | A1 * | 3/2012 | Harada | B60T 8/4031 | 701/38 |
| 2012/0247888 | A1 * | 10/2012 | Chikuma | B60G 17/08 | 701/38 |
| 2014/0358371 | A1 * | 12/2014 | Kikuchi | B60W 10/18 | 701/37 |
| 2015/0061244 | A1 * | 3/2015 | Klein | B60G 15/062 | 280/5.515 |
| 2015/0224845 | A1 * | 8/2015 | Anderson | B60G 13/14 | 701/37 |
| 2016/0243916 | A1 * | 8/2016 | Kubota | B60G 17/015 | |
| 2017/0153170 | A1 * | 6/2017 | Starke | G01N 3/02 | |
| 2017/0166028 | A1 * | 6/2017 | Kubota | B60G 17/01908 | |
| 2024/0300275 | A1 * | 9/2024 | Anderson | B60G 11/265 | |
| 2025/0128564 | A1 * | 4/2025 | Yamashita | B60G 17/0182 | |

* cited by examiner

[FIG. 1]
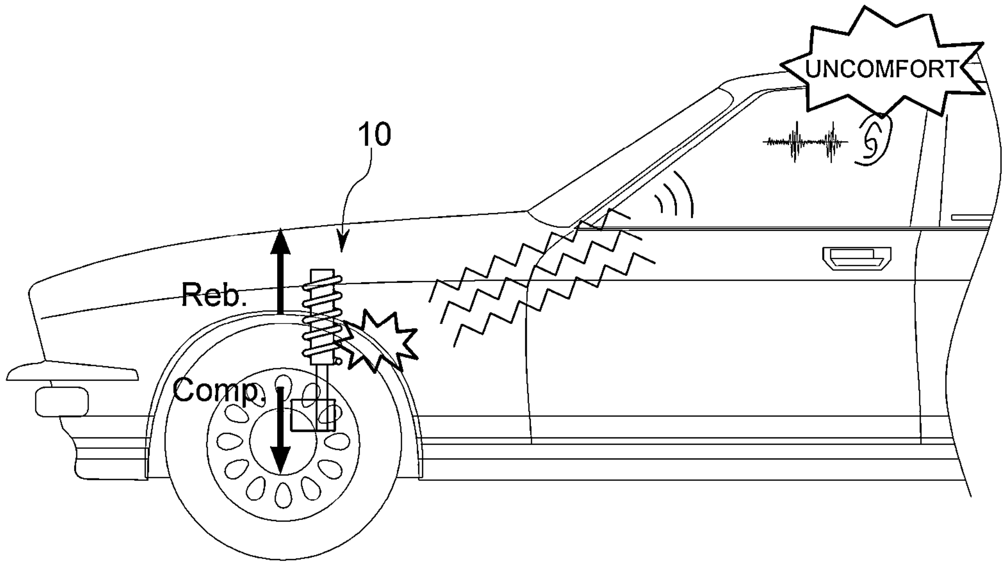
[FIG. 2]
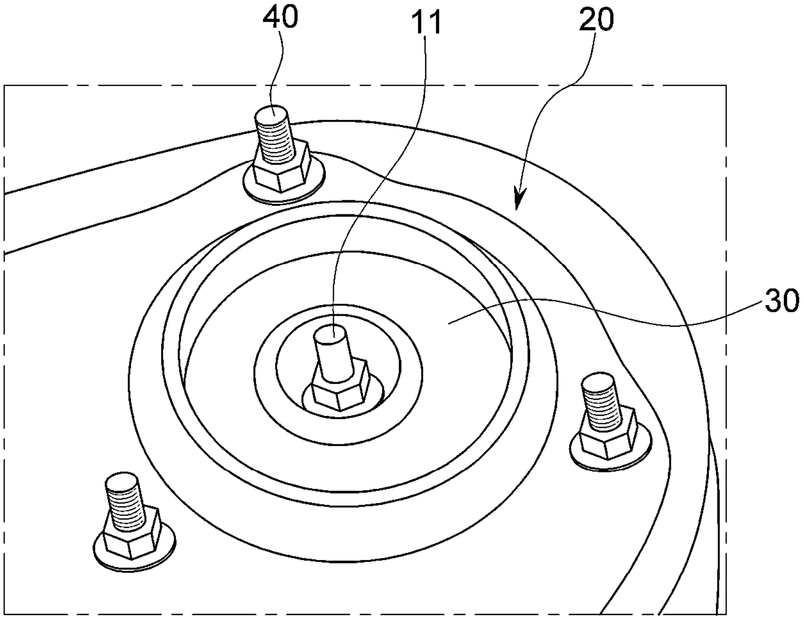

[FIG. 3]
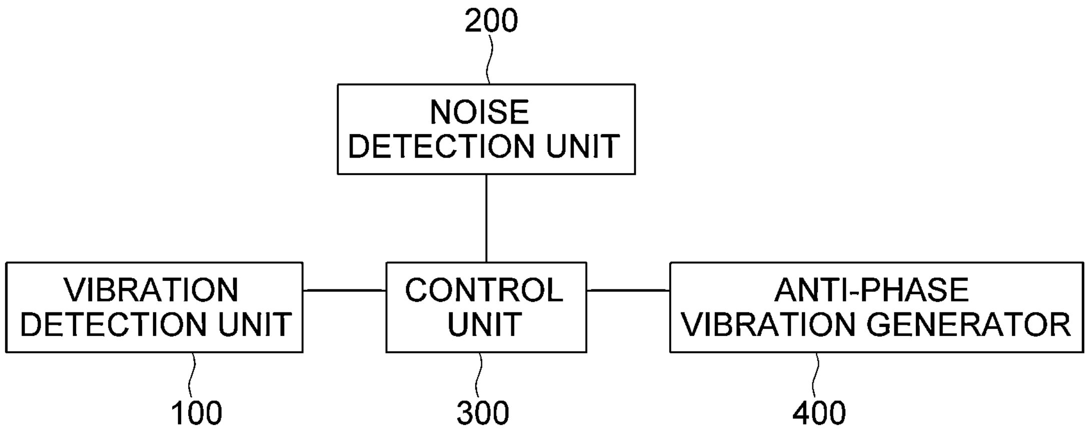
[FIG. 4]
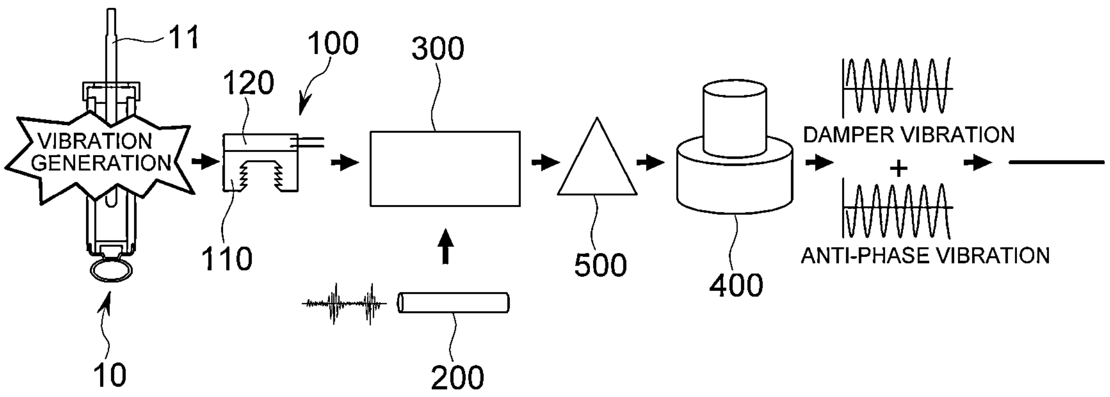

[FIG. 5]
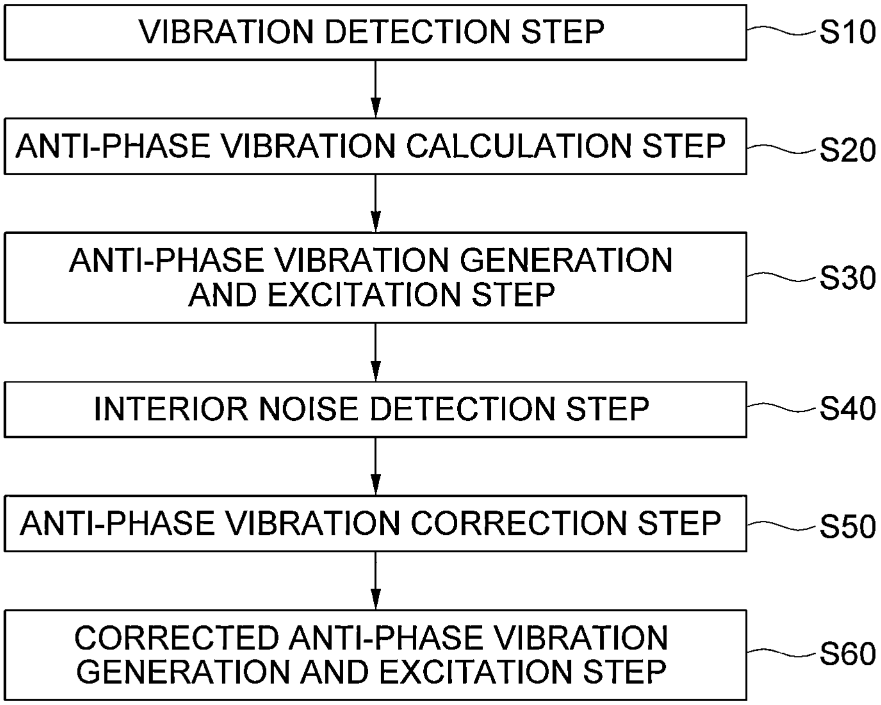

[FIG. 6]
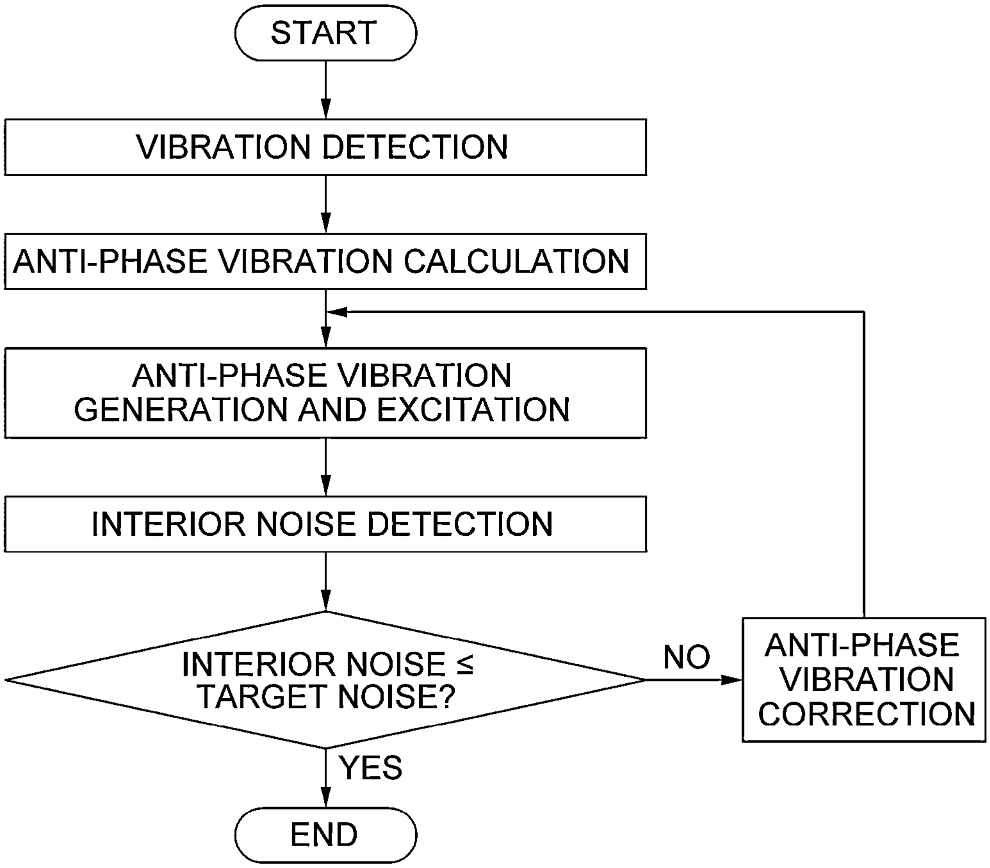

NOISE REDUCTION SYSTEM AND NOISE REDUCTION METHOD FOR AUTOMOBILE SUSPENSION

TECHNICAL FIELD

The present disclosure relates to an automobile noise reduction system and noise reduction method, and more specifically, to a noise reduction system and a noise reduction system for an automobile suspension for reducing structurally transmitted noise that is caused by vibrations generated when a damper of the suspension operates and enters the interior of the automobile.

BACKGROUND

Suspension systems of automobiles have been developed primarily for ride comfort and driving safety, absorbing shocks and vibrations from the road surface. The stroke conversion of a damper generates vibrations, and the noise caused by the vibrations entering the interior of the automobile through the structure is called structurally transmitted noise. The structurally transmitted noise caused by the operation of the damper has been difficult to recognize because it is masked by the engine vibration and noise of the internal combustion engine. However, as electric vehicles have recently been developed and commercialized, the problem of structurally transmitted noise has been highlighted.

The conventional suspension systems only focus on improving the driver's driving convenience and shock absorption ability, so there are limitations in reducing structurally transmitted noise.

SUMMARY

In view of the above, the present disclosure provides a noise reduction system and a noise reduction method for an automobile suspension, which can effectively reduce structurally transmitted noise caused by vibrations generated when a damper of the suspension operates and transmitted to the interior of the automobile.

A noise reduction system for an automobile suspension, in accordance with a preferred embodiment of the present disclosure, comprises: a vibration detection unit that is mounted on an suspension damper; an anti-phase vibration generator that is mounted on a top mount portion of a vehicle body on which the suspension damper is mounted and generates vibration in an opposite phase to vibration generated when the damper operates to be applied to the top mount portion; and a control unit that receives a measurement value detected by the vibration detection unit, calculates a target anti-phase vibration, and controls the anti-phase vibration generator.

The vibration detection unit is mounted on a rod of the damper.

The vibration detection unit includes: a sensor jig that is detachably screwed to the rod; and a vibration sensor provided in the sensor jig.

The vibration sensor is a piezoelectric sensor.

The piezoelectric sensor is a thin film piezoelectric sensor.

The vibration detection unit is screwed to an end portion of the rod exposed upwardly of the top mount portion.

The anti-phase vibration generator is a voice coil type.

The anti-phase vibration generator is provided in an upper portion of the top mount portion at a position spaced apart from a fastening portion where the damper and the top mount portion are fastened toward an interior of a vehicle.

The anti-phase vibration generator generates anti-phase vibration in a direction parallel to an operating direction of the damper.

The control unit is a digital signal processor (DSP) using a variable step size least mean squares (VSS-LMS) algorithm.

The noise reduction system further comprises a noise detection unit that detects interior noise of an automobile and transmits a detection signal to the control unit.

The control unit corrects the anti-phase vibration according to the noise detected by the noise detection unit.

A noise reduction method for an automobile suspension, in accordance with a preferred embodiment of the present disclosure, comprises: a vibration detection step of detecting vibration transmitted from a suspension damper to a top mount portion using a vibration detection unit and transmitting a measurement value to a control unit; an anti-phase vibration calculation step of calculating a target anti-phase vibration value based on the vibration measurement value in the control unit; and an anti-phase vibration generation and excitation step of generating anti-phase vibration in an anti-phase vibration generation unit to be applied to the top mount portion under the control of the control unit.

The noise reduction method further comprises an interior noise detection step of detecting interior noise in a noise detection unit and transmitting a measured noise value to the control unit.

The noise reduction method further comprises a noise comparison step of comparing the measured noise value transmitted to the control unit and a target noise value.

The noise reduction method further comprises an anti-phase vibration correction step of correcting a target anti-phase vibration value when the measured noise value is determined to be greater than the target noise value in the noise comparison step.

The vibration detection unit detects vibration transmitted to an end portion of a rod of the damper, and the anti-phase vibration generator applies anti-phase vibration on a vibration transmission path on the top mount portion.

The application direction of the anti-phase vibration is parallel to an operating direction of the damper, and the vibration detection through the vibration detection unit is made at an end portion of the rod exposed upwardly of the top mount portion, and the application of the anti-phase vibration is made at an upper surface of the top mount portion.

According to the noise reduction system and noise reduction method for an automobile suspension of the present disclosure, structurally transmitted noise generated in the process in which vibrations generated by the stroke conversion of the suspension damper is transmitted to the interior can be effectively reduced. In particular, by detecting the vibration transmitted from the damper to the interior and by additionally receiving feedback of the interior noise and correcting the anti-phase vibration during the application of the anti-phase vibration, it is possible to provide a driver with a comfortable driving environment and improve the driving stability of the automobile.

In addition, since the vibration sensor is detachably mounted on the end portion of the rod exposed above the top mount, the vibration generated when the damper operates can be effectively sensed and the vibration sensor can be easily mounted and replaced.

Further, by mounting the anti-phase vibration generator on the vibration transmission path on the upper surface of the top mount portion, vibration transmitted from the damper to the interior of the automobile can be effectively offset, and the anti-phase vibration generator can be easily mounted and replaced.

BRIEF DESCRIPTION OF THE DRAWINGS

FIG. 1 is a diagram showing the transmission of vibration generated from a damper of an automobile suspension to the interior of an automobile.

FIG. 2 is a diagram showing a top mount portion of a vehicle body where the damper of the automobile suspension is mounted.

FIG. 3 is a configuration diagram of an automobile suspension noise reduction system according to a preferred embodiment of the present disclosure.

FIG. 4 is a diagram showing a flow of a noise reduction by the automobile suspension noise reduction system according to the preferred embodiment of the present disclosure.

FIG. 5 is a process diagram showing the process of reducing noise by an automobile suspension noise reduction method according to a preferred embodiment of the present disclosure.

FIG. 6 is a flowchart showing the process of reducing noise by the automobile suspension noise reduction method according to the preferred embodiment of the present disclosure.

DETAILED DESCRIPTION

Hereinafter, a noise reduction system and a noise reduction method for an automobile suspension according to a preferred embodiment of the present disclosure will be described in detail with reference to the accompanying drawings.

FIG. 1 is a diagram showing the transmission of vibration generated from a damper 10 of an automobile suspension is transmitted to the interior of an automobile.

In the damper 10 of the automobile suspension, a pressure difference occurs between upper and lower chambers in a cylinder at the time when the compression stroke and the tension stroke are converted, and vibration occurs due to rapid pressure changes.

The vibration generated in the damper 10 is transmitted to a wheel of the automobile, but is also transmitted to the interior of the automobile through a rod of the damper 10 and a top mount of a vehicle body. In the process in which the vibration is transmitted to the interior of the automobile, structurally transmitted noise is generated.

As mentioned above, conventionally, even if structurally transmitted noise is transmitted to the interior of the automobile, it is difficult to recognize because it is masked by the engine noise and vibration of the internal combustion engine. However, with the recent development of electric vehicles, it has been highlighted, and it is recognized that the structurally transmitted noise needs to be reduced to reduce driver fatigue and improve driving stability.

FIG. 2 is a diagram showing a top mount portion 20 of the vehicle body where the damper 10 of the automobile suspension is mounted.

The damper 10 is mounted on the top mount portion 20 of the vehicle body. An end portion of a rod 11 constituting the damper 10 penetrates a bush 30 and is exposed upwardly of the top mount portion 20. The damper 10 is mounted on the top mount portion 20 using a mount, and three bolts 40 mounted on the mount are nut-fastened while penetrating the upper surface of the top mount portion 20. Vibration generated by the operation of the damper is transmitted to the top mount portion 20 through the rod 11 and the mount.

FIG. 3 is a configuration diagram of an automobile suspension noise reduction system according to a preferred embodiment of the present disclosure, and FIG. 4 is a diagram showing a flow of a noise reduction by the automobile suspension noise reduction system according to the preferred embodiment of the present disclosure.

The automobile suspension noise reduction system according to the preferred embodiment of the present disclosure includes a vibration detection unit 100, a noise detection unit 200, a control unit 300, and an anti-phase vibration generator 400.

The vibration detection unit 100 is mounted on the suspension damper 10 to detect vibration generated from the damper 10, and is detachably mounted on the end portion of the rod 11 exposed upwardly of the top mount portion 20. The vibration detection unit 100 includes a sensor jig 110 detachably screwed to the end portion of the rod 11, and a vibration sensor 120 provided on the sensor jig 110.

By mounting the vibration detection unit 100 on the end portion of the rod 11, the maintenance of the vibration detection unit 100 is easy and the vibration detection unit 100 can effectively detect vibration generated by the operation of the damper 10. That is, the vibration detection unit 100 is detachably mounted on the end portion of the rod 11 at the upper side of the top mount portion 20, so it is easy for a worker to access during initial installation and maintenance, and it is advantageous for packaging in the bonnet space. In addition, during the compression and tension strokes of the damper 10, a piston valve and the rod 11 are moved up and down, and the vibration caused by the pressure difference generated in the process is directly transmitted to the rod 11, so vibration generated from the damper 10 can be effectively sensed when the vibration detection unit 100 is mounted on the end portion of the rod 11 as in the present disclosure.

A piezoelectric sensor may be used as the vibration sensor 120, and the piezoelectric sensor may be provided in a thin film form and mounted on the sensor jig 110. The measurement value detected by the vibration sensor 120 is transmitted to the control unit 300. The vibration sensor 120 detects the frequency and amplitude of vibration in real time.

The noise detection unit 200 detects noise generated in the interior of the automobile in real time and may include a microphone. The measurement value detected by the noise detection unit 200 is transmitted to the control unit 300 in real time. Noise generation in the interior can be effectively controlled through feedback control in which the noise detection unit 200 monitors the noise in the interior in real time and transmits the results to the control unit 300.

The control unit 300 calculates a target anti-phase vibration value by considering both the measurement values detected by the vibration detection unit 100 and the noise detection unit 200, and controls the anti-phase vibration generator 400 based on the calculated value. The control unit 300 extracts signal characteristics such as frequency, amplitude, and phase through a digital signal processor (DSP) using a variable step size least mean squares (VSS-LMS) algorithm, and uses them for frequency analysis and phase analysis to quantify and extract a relative phase difference between an input signal and a reference signal. Unlike the general-purpose FX-LMS, VSS-LMS can improve the convergence speed and safety of filtering by dynamically adjusting the step size used to update the weights of the adaptive filter.

The anti-phase vibration generator 400 transmits a command signal generated from the control unit 300 to a voice coil type actuator to generate anti-phase vibration according to a control signal and excites the vibration transmission path, thereby effectively offsetting vibration transmitted to the interior and reducing structurally transmitted noise. The voice coil type actuator is easy to measure vibration in a short time and transmit anti-phase vibration with high accuracy and fast response speed, and have the advantage of small size and weight reduction. In addition, the voice coil type actuator can be easily mounted on the top mount portion 20 of the vehicle body, and can effectively offset vibration by being mounted at the optimal position in the vibration transmission path.

When the anti-phase vibration generator 400 is installed parallel to the installation direction of the vibration detection unit 100, the anti-phase vibration generated from the anti-phase vibration generator 400 can effectively offset the vibration. That is, since the vibration detection unit 100 is mounted on the end portion of the rod 11 of the damper 10, when the anti-phase vibration is excited in parallel to the operating direction of the damper 10 (the moving direction of the rod 11), the vibration transmitted to the interior can be offset most effectively.

The anti-phase vibration generating unit 400 is mounted on the upper surface of the top mount portion 20 and is installed on a transmission path of vibration transmitted to the interior along the top mount portion 20. In particular, the damper 10 and the top mount part 20 are fastened using a three-point fastening method, and the anti-phase vibration generator 400 may be mounted on a path connecting the fastening part located closest to the interior and the interior. The anti-phase vibration generator 400 may be mounted at a location that is advantageous in terms of maintenance on the vibration transmission path.

Meanwhile, reference numeral 500 indicates a power amplifier.

FIG. 5 is a process diagram showing the process of reducing noise by an automobile suspension noise reduction method according to a preferred embodiment of the present disclosure, and FIG. 6 is a flowchart showing the process of reducing noise by the automobile suspension noise reduction method according to the preferred embodiment of the present disclosure.

The automobile suspension noise reduction method according to the preferred embodiment of the present disclosure includes a vibration detection step S10, an anti-phase vibration calculation step S20, an anti-phase vibration generation and excitation step S30, an interior noise detection step S40, an anti-phase vibration correction step S50, and a corrected anti-phase vibration generation and excitation step S60.

In the vibration detection step S10, vibration transmitted to the rod 11 of the damper 10 is detected using the vibration detection unit 100. The vibration detected at the end portion of the rod 11 can be regarded as vibration transmitted from the damper 10 to the interior along the top mount portion 20. The measurement value detected in the vibration detection step S10 is converted into an electrical signal and transmitted to the control unit 300.

In the anti-phase vibration calculation step S20, the control unit 300 calculates a target anti-phase vibration value using the vibration measurement value transmitted from the vibration detection unit 100. The control unit 300 calculates the target anti-phase vibration value through the process of extracting signal characteristics such as frequency, amplitude, and phase through a digital signal processor (DSP) using a VSS-LMS algorithm, and using them for frequency analysis and phase analysis to quantify and extract a relative phase difference between an input signal and a reference signal.

In the anti-phase vibration generation and excitation step S30, the anti-phase vibration generator 400 operates according to the target anti-phase vibration value calculated by the control unit 300 to generate anti-phase vibration and apply the anti-phase vibration to the top mount portion 20. The anti-phase vibration generator 400 is provided on a path along which vibration generated when the damper 10 operates is transmitted to the interior, and applies anti-phase vibration parallel to the operating direction of the damper 10. The vibration transmitted from the damper 10 to the interior through the top mount portion 20 is excited in the operating direction of the damper 10, and correspondingly, anti-phase vibration is also excited in the operating direction of the damper 10, so that effective vibration offset can be achieved.

In the interior noise detection step S40, noise in the interior is detected through the noise detection unit 200, and the detected measurement value is converted into an electrical signal and transmitted to the control unit 300 in real time. When the measured noise value is transmitted to the control unit 300, the control unit 300 compares the measured noise value with a target noise value. The target noise value may be input in advance to the control unit 300.

In the anti-phase vibration correction step S50, a procedure is performed to compare the measured noise value and the target noise value and correct the target anti-phase vibration value to be excited when the measured noise value is greater than the target noise value.

In the corrected anti-phase vibration generation and excitation step S60, corrected anti-phase vibration is generated in the anti-phase vibration generator 400 according to the correction value of the target anti-phase vibration calculated by the control unit 300, and applied to the top mount portion 20.

The processes of the noise detection, the target anti-phase vibration value correction, and the corrected anti-phase vibration generation and excitation are repeated until the interior noise value detected by the noise detection unit 200 is equal to or smaller than the target noise value.

When the noise value detected in the interior is equal to or smaller than the target noise value, the process returns to the initial step, that is, the vibration detection step (S10) in the vibration detection unit 100.

While the noise reduction system and noise reduction method for the automobile suspension according to the preferred embodiment of the present disclosure have been described in detail with reference to the accompanying drawings as described above, the present disclosure is not limited to the above-described embodiments and may be implemented in various modifications within the scope of the following claims.

(Description of Reference Numerals)

| | |
|---|---|
| 10: damper | 11: rod |
| 20: top mount portion | 30: bush |
| 100: vibration detection unit | 110: sensor jig |
| 120: vibration sensor | 200: noise detection unit |
| 300: control unit | 400: anti-phase vibration generator |
| S10: vibration detection step | |
| S20: anti-phase vibration calculation step | |
| S30: anti-phase vibration | |

-continued

| (Description of Reference Numerals) |
| --- |
| generation and excitation step |
| S40: interior noise detection step |
| S50: anti-phase vibration correction step |
| S60: corrected anti-phase vibration generation and excitation step |

What is claimed is:

1. A noise reduction system for an automobile suspension, comprising:

a vibration detection unit that is mounted on a rod of a suspension damper;

an anti-phase vibration generator that is mounted on a top mount portion of a vehicle body on which the suspension damper is mounted and generates anti-phase vibration in an opposite phase to vibration generated when the damper operates to be applied to the top mount portion; and a control unit that receives a measurement value detected by the vibration detection unit, calculates a target anti-phase vibration, and controls the anti-phase vibration generator, wherein the vibration detection unit detects vibration transmitting from a suspension damper to a top mount portion, wherein the anti-phase vibration is applied to the top mount portion to reduce structure-borne noise transmitted from the suspension damper to a vehicle interior.

2. The noise reduction system of claim 1, wherein the vibration detection unit includes:

a sensor jig that is detachably screwed to the rod; and a vibration sensor provided in the sensor jig.

3. The noise reduction system of claim 2, wherein the vibration sensor is a piezoelectric sensor.

4. The noise reduction system of claim 3, wherein the piezoelectric sensor is a thin film piezoelectric sensor.

5. The noise reduction system of claim 2, wherein the vibration detection unit is screwed to an end portion of the rod exposed upwardly of the top mount portion.

6. The noise reduction system of claim 1, wherein the anti-phase vibration generator is a voice coil type.

7. The noise reduction system of claim 1, wherein the anti-phase vibration generator is provided in an upper portion of the top mount portion at a position spaced apart from a fastening portion where the damper and the top mount portion are fastened toward an interior of a vehicle.

8. The noise reduction system of claim 1, wherein the anti-phase vibration generator generates anti-phase vibration in a direction parallel to an operating direction of the damper.

9. The noise reduction system of claim 1, wherein the control unit is a digital signal processor (DSP) using a variable step size least mean squares (VSS-LMS) algorithm.

10. The noise reduction system of claim 1, further comprising a noise detection unit that detects interior noise of an automobile and transmits a detection signal to the control unit.

11. The noise reduction system of claim 10, wherein the control unit corrects the anti-phase vibration according to the noise detected by the noise detection unit.

12. A noise reduction method for an automobile suspension, comprising:

a vibration detection step of detecting vibration transmitted from a suspension damper to a top mount portion using a vibration detection unit and transmitting a measurement value to a control unit;

an anti-phase vibration calculation step of calculating a target anti-phase vibration value based on the vibration measurement value in the control unit; and an anti-phase vibration generation and excitation step of generating anti-phase vibration in an anti-phase vibration generation unit to be applied to the top mount portion under the control of the control unit, wherein the vibration detection unit that is mounted on a rod of the suspension damper, wherein the anti-phase vibration is applied to the top mount portion to reduce structure-borne noise transmitted from the suspension damper to a vehicle interior.

13. The noise reduction method of claim 12, further comprising an interior noise detection step of detecting interior noise in a noise detection unit and transmitting a measured noise value to the control unit.

14. The noise reduction method of claim 13, further comprising a noise comparison step of comparing the measured noise value transmitted to the control unit and a target noise value.

15. The noise reduction method of claim 14, further comprising an anti-phase vibration correction step of correcting a target anti-phase vibration value when the measured noise value is determined to be greater than the target noise value in the noise comparison step.

16. The noise reduction method of claim 12, wherein the anti-phase vibration generator applies anti-phase vibration on a vibration transmission path on the top mount portion.

17. The noise reduction method of claim 16, wherein the application direction of the anti-phase vibration is parallel to an operating direction of the damper.

18. The noise reduction method of claim 12, wherein the vibration detection unit detects vibration transmitted to an end portion of a rod of the damper.

19. The noise reduction method of claim 12, wherein the vibration detection through the vibration detection unit is made at an end portion of the rod exposed upwardly of the top mount portion, and the application of the anti-phase vibration is made at an upper surface of the top mount portion.

* * * * *